Feb. 17, 1931.  R. E. LEONARD  1,792,646
PISTON OR PLUNGER ROD WASHING APPARATUS
Filed March 19, 1929  2 Sheets-Sheet 1
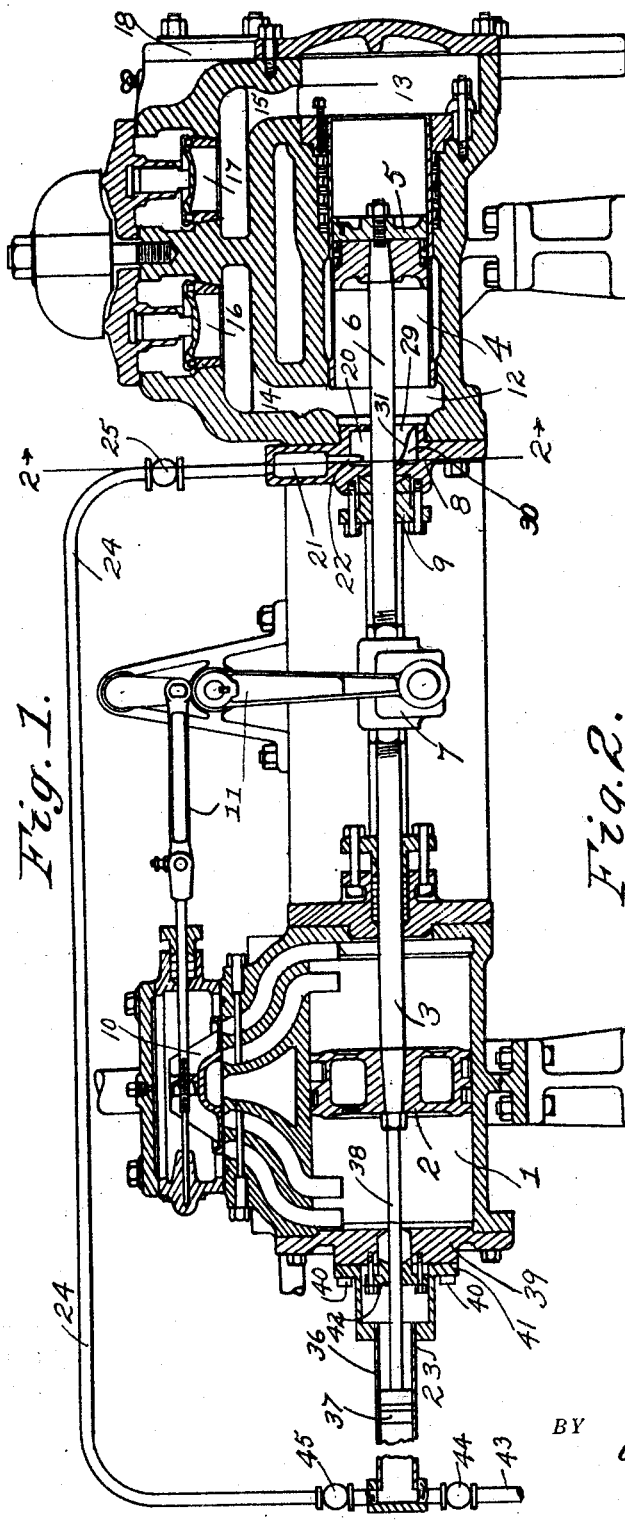
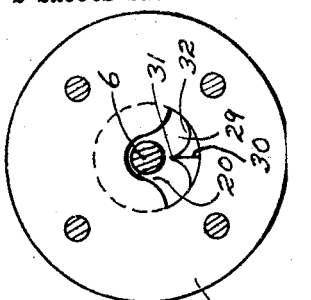
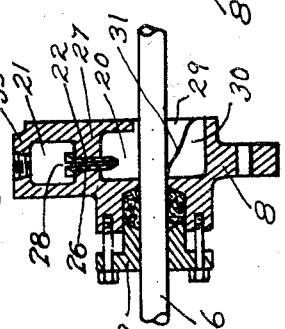
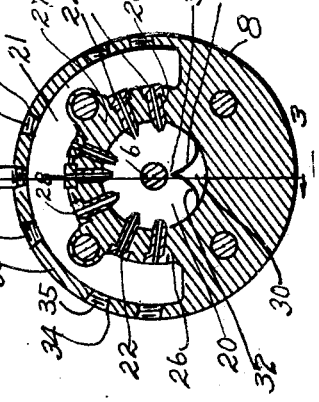
INVENTOR
Roy E. Leonard.
BY Alan Franklin
ATTORNEY

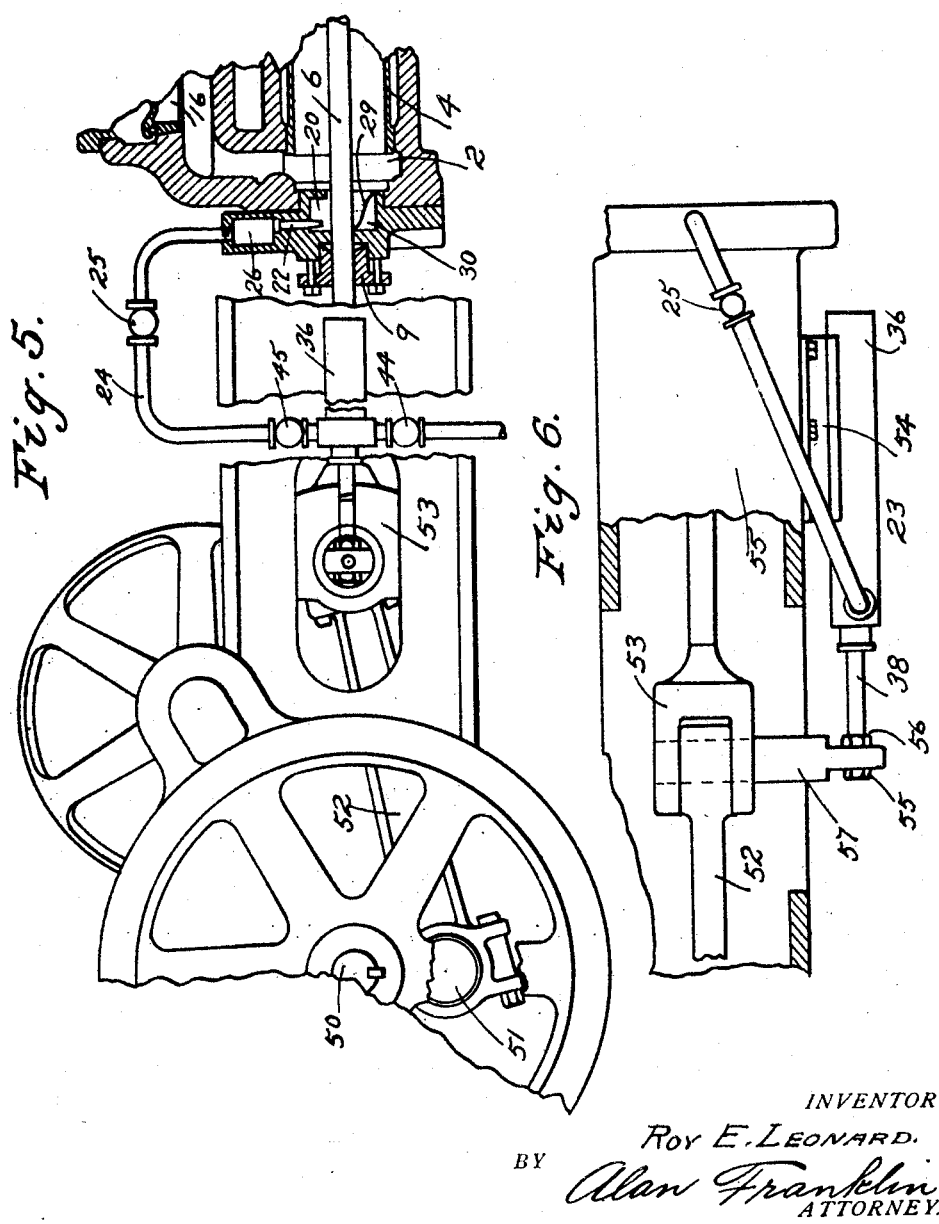

Patented Feb. 17, 1931

1,792,646

UNITED STATES PATENT OFFICE

ROY E. LEONARD, OF LOS ANGELES, CALIFORNIA

PISTON OR PLUNGER ROD WASHING APPARATUS

Application filed March 19, 1929. Serial No. 348,193.

This invention is a piston or plunger rod washing apparatus, and relates more particularly to an apparatus for washing mud and grit from the plunger rod of a mud pump, such as used in rotary oil well drilling whereby undue friction and wear between piston rod and its packing box is eliminated.

In the use of pumps for the circulation of mud in rotary oil well drilling, a very decided abrasion of the pump plunger rod takes place on account of the mud or muddy water carrying more or less grit and sand, which in the passage of the plunger rod through the packing embeds itself in the packing and remains as an abrasive, which scores and cuts the piston rod, causing it to become loose in the packing and allowing the fluid to escape through the packing box as well as doing great damage to the piston rod and packing.

The general object of the invention is to provide an apparatus for washing mud and grit from the plunger rod of a pump such as a mud pump to prevent friction and wear between plunger rod and packing box and the consequent escape of fluid through the packing box, as well as serious damage to the plunger rod and packing box.

A more particular object is to provide an apparatus for washing mud and grit from a plunger rod before it passes outwardly through its packing box and while it is inside the pump cylinder.

A further object is to provide a simple and inexpensive apparatus which will be practical and highly efficient in operation and which may be installed at little cost on any duplex or steam-driven mud pump.

Other objects and advantages will appear hereinafter.

The invention is illustrated in the annexed drawings which form a part of this specification and in which, Fig. 1 is a longitudinal section of a steam driven mud pump embodying my invention.

Fig. 2 is a transverse vertical section of my invention on an enlarged scale taken on line 2—2 of Fig. 1.

Fig. 3 is a longitudinal section of my invention on an enlarged scale taken on line 3—3 of Fig. 2.

Fig. 4 is an inner side view of the pump chamber head.

Fig. 5 is a fragmentary view partly in side elevation and partly in longitudinal section of a duplex power or gear driven mud pump embodying my invention.

Fig. 6 is a view partly in horizontal section and partly in elevation of the pump with my invention as shown in Fig. 4.

Corresponding parts are designated by the same reference characters in all the figures.

In Figs. 1 to 3 inclusive, in which I have illustrated my invention applied to a steam-driven mud pump, 1 designates the pump steam cylinder, 2 the steam piston, 3 the piston rod, 4 the pump cylinder, 5 the pump plunger, 6 the plunger rod connected to the piston rod 3 by crosshead 7, 8 the head of the pump cylinder, and 9 the plunger rod packing box mounted on said pump cylinder head. The steam cylinder valve 10 is operated by a piston rod 3 through the cross head 7 and valve operating mechanism 11. The pump cylinder 4 is constructed with the usual inlets 12 and 13, outlet ports 14 and 15, outlet valves 16 and 17 and discharge outlet 18.

My invention comprises a washing chamber 20, through which the plunger rod 6 extends, a nozzle intake chamber 21, washing nozzles 22, an auxiliary pulsating washing pump 23, a pipe 24 leading from the outlet of said auxiliary pump into said nozzle chamber, and a spring loaded valve 25 in said pipe 24.

The washing chamber 20 and nozzle intake chamber 21 are preferably cast in the pump chamber head 8, with the washing chamber located centrally of the head and the nozzle intake chamber located exteriorly of the washing chamber. The nozzles 22 are screw-seated in bores 26 which extend through the partition wall 27 between the washing chamber and nozzle intake chamber, said nozzles having slots 28 in their outer ends to receive a screw driver for screwing the nozzles into the bores 26 or unscrewing the nozzles from said bores. The nozzles 22 are spaced half way around the upper half of the washing chamber 20 and plunger rod 6 which rod extends concentrically through the washing chamber. The washing chamber 20 is provided with an outlet 29 leading into the adjacent end of the pump cylinder 4, said outlet extending eccentrically around the plunger rod 6 with its upper edge near the upper side of the plunger rod 6, providing a narrow outlet space above the rod which increases in area below the rod so that the greater part of the water discharges from the washing chamber below the rod, after washing the rod. A vane 30 is provided in the lower part of the washing chamber 20 which extends from the inner wall of the chamber below the plunger rod through the outlet 29, the upper edge 31 of the vane extending downwardly from a point adjacent the under side of the plunger rod at the inner wall of the washing chamber to a point below the plunger rod in the outlet 29, while the sides 32 of the vane converge upwardly from the lower side of the washing chamber to the edge 31 and rearwardly from the inner side of the washing chamber to the edge 31 of the vane at the outlet end thereof, the purpose of said vane being to direct the water from the nozzles 22, after it has washed the upper portion of the plunger rod, upwardly against the under side of the plunger rod to wash said side of the rod before the water discharges from the washing chamber through the outlet 29 into the pump cylinder.

The outer wall 33 of the nozzle intake chamber 21 is bored at 34 in alignment with the nozzle bores 26 respectively, through which bores 34 the nozzles 22 may be introduced into the bores 26 or removed therefrom. The bores 34 are all normally closed with screw plugs 35 except one in which one end of the pipe 24 is connected with the nozzle intake chamber.

The auxiliary washing pump 23 comprises a cylinder 36, a plunger 37 and a plunger rod 38. The cylinder 36 may be bolted on to the outer head 39 of the steam cylinder 1 by means of bolts 40 extending through an external flange 41 on the base of the cylinder 36. A packing box 42 may be constructed in the steam cylinder head 39 through which packing and head the plunger rod 38 of the auxiliary pump 23 may extend and reciprocate with the steam cylinder piston; said plunger rod, as shown in the drawing for illustration only, being an extension of the steam piston rod 3. An inlet pipe 43 leading from a source of clean water or other washing fluid is connected to the inlet of the auxiliary pump 23, and is controlled by a pump inlet valve 44. The pipe 24 is controlled by a pump outlet valve 45 as well as the spring loaded valve 25 which opens under the high pressure of the washing pump 23, but remains closed against the suction of the pump plunger 5, whereby the cleaning fluid may be pumped, by the washing pump 23, into and through the washing chamber 20, but cannot be drawn into and through said chamber by the suction of the pump plunger 5.

The operation of my invention is as follows:

As the piston 2 and rod 3 of the steam cylinder 1 and the plunger rod 6 and pump plunger 5 move toward the left, the washing pump plunger 37, through its rod 38, is correspondingly moved, whereupon water or other cleaning fluid is pumped from its source through pipes 43 and 24 into the nozzle intake chamber 21, and through nozzles 22 into the washing chamber 20 and against surface of the plunger rod 6, washing the mud and grit off the rod before said rod passes into the packing box 9, (the spring loaded valve 25 opening under the pressure of the washing pump to allow the washing fluid to pass therethrough). The water or cleaning fluid falling from the upper surface of the plunger rod is directed upwardly by the vane 30 against the lower half of the surface of the plunger rod before the rod passes into the packing box, washing the mud and grit from said lower surface portion of the rod, whereupon the mud and grit and muddy water or cleaning fluid, guided by the vane 30, is forced by the washing pump 23 and by the pump plunger 5 moving toward the left, from the washing chamber 20 out through the outlet 29 into the adjacent end of the pump cylinder 4, outlet port 14, valve 16 and discharge outlet 18, with the mud that is pumped by the pump, (the higher pressure of the washing pump 23 overcoming the lower pressure of the pump plunger 5 to prevent the water from backing up in the pipe 24 and to cause the cleaning fluid mud and grit to be pumped out of the pump as aforesaid). The valve 25 closes when the washing pump plunger 37 and rod 38 and the pump plunger 5 and rod 6 move to the right, preventing the suction of the pump plunger 5 from drawing fluid through the pipe 24 into the washing chamber 20.

In Figs. 5 and 6, in which I have illustrated my invention applied to a power or gear driven mud pump, 50 designates the crank shaft of the pump, 51 the crank, 52 the connecting rod and 53 the cross head. The pump cylinder, plunger and plunger rod may be of the same construction as in the pump illustrated in Fig. 1; the plunger rod 6 however being connected to the cross head 53.

My invention is applied to the pump shown in Figs. 5 and 6 in the same manner as in the pump shown in Fig. 1 except that the cylinder 36 of the auxiliary washing pump 23 is mounted by means of a bracket 54 on one side of the frame 55 of the pump, while the plunger rod 38 is connected by means of nuts 55 and 56 to an arm 57 secured to the cross head.

The operation of my invention as illustrated in Figs. 5 and 6 is the same as shown in Figs. 1 to 4 inclusive except that the plunger rod 38 of the washing pump 23 is operated from the cross head 53 through arm 57.

I do not limit my invention to the exact construction herein disclosed because various changes may be made therein without departing from the spirit of the invention.

I claim as my invention:

1. In combination with the plunger rod and packing box of a pump, a washing chamber through which said rod passes, a nozzle intake chamber, a plurality of nozzles extending from said nozzle intake chamber into said washing chamber for directing washing fluid against the surface of said rod, a vane in said washing chamber for directing the washing fluid in said washing chamber against the under side of said plunger rod, and means for introducing washing fluid into said nozzle intake chamber.

2. In combination with the pump cylinder, plunger, plunger rod and packing box of a pump, a washing chamber, through which said plunger rod extends, provided with an outlet leading into one end of said pump cylinder, a nozzle intake chamber, a plurality of nozzles leading from said intake chamber into said washing chamber for directing washing fluid against the upper surface of said rod, a vane for directing the washing fluid against the under surface of said plunger rod and for directing the used washing fluid and mud and grit through said outlet into the adjacent end of the pump cylinder, means for forcing washing fluid into said nozzle intake chamber, nozzles and washing chamber at a higher pressure than the pressure in said pump cylinder on each compression stroke of the plunger for washing the plunger rod each time before it enters the packing box, and means for preventing the suction of said plunger from drawing washing fluid into said washing chamber on each suction stroke of said plunger.

3. The combination with a mud pump, of a washing pump mounted on the outer head of the steam cylinder of the mud pump, the plunger rod of the washing pump being connected to the steam cylinder piston and extending through said outer steam cylinder head, and means to enable the washing pump to direct washing fluid against the plunger rod of the mud pump for washing said rod.

ROY E. LEONARD.